(12) United States Patent
Roesch et al.

(10) Patent No.: US 9,542,662 B2
(45) Date of Patent: Jan. 10, 2017

(54) LINEAGE INFORMATION FOR STREAMING EVENT DATA AND EVENT LINEAGE GRAPH STRUCTURES FOR VISUALIZATION

(75) Inventors: Philipp Roesch, Dresden (DE); Sebastian Weng, Dresden (DE)

(73) Assignee: SAP SE, Walldorf (DE)

( * ) Notice: Subject to any disclaimer, the term of this patent is extended or adjusted under 35 U.S.C. 154(b) by 701 days.

(21) Appl. No.: 12/982,012

(22) Filed: Dec. 30, 2010

(65) Prior Publication Data
US 2012/0173747 A1    Jul. 5, 2012

(51) Int. Cl.
*G06F 15/16* (2006.01)
*G06Q 10/06* (2012.01)

(52) U.S. Cl.
CPC .................. *G06Q 10/063* (2013.01)

(58) Field of Classification Search
CPC ............................ G06F 15/173; G06Q 10/063
USPC ......................................... 709/224–225, 231
See application file for complete search history.

(56) References Cited

U.S. PATENT DOCUMENTS

| | | | | |
|---|---|---|---|---|
| 6,910,070 | B1 * | 6/2005 | Mishra et al. ............... | 709/224 |
| 7,457,728 | B2 * | 11/2008 | Chen et al. .................. | 702/189 |
| 7,610,342 | B1 * | 10/2009 | Pettigrew et al. ........... | 709/206 |
| 7,899,901 | B1 * | 3/2011 | Njemanze et al. .......... | 709/224 |
| 8,209,402 | B1 * | 6/2012 | Smith et al. ................. | 709/219 |
| 8,209,747 | B2 * | 6/2012 | Ottamalika et al. .......... | 726/11 |
| 2004/0117768 | A1 * | 6/2004 | Chang et al. ................ | 717/125 |
| 2005/0138081 | A1 * | 6/2005 | Alshab et al. ............... | 707/200 |
| 2007/0198234 | A1 * | 8/2007 | Zangl et al. ................. | 703/2 |
| 2007/0208680 | A1 * | 9/2007 | Wang et al. .................. | 706/47 |
| 2007/0213786 | A1 * | 9/2007 | Sackellares et al. ......... | 607/45 |
| 2007/0250461 | A1 * | 10/2007 | Sabe et al. ................... | 706/12 |
| 2008/0297513 | A1 * | 12/2008 | Greenhill et al. ........... | 345/440 |
| 2009/0217248 | A1 * | 8/2009 | Bently .................... | G06F 8/30 717/132 |
| 2009/0274375 | A1 * | 11/2009 | Kavanau et al. ............. | 382/224 |
| 2010/0125545 | A1 * | 5/2010 | Navas .......................... | 707/602 |
| 2011/0066598 | A1 * | 3/2011 | Wilson et al. ............... | 707/661 |
| 2011/0066602 | A1 * | 3/2011 | Studer ................ | G06F 17/2264 707/690 |

(Continued)

OTHER PUBLICATIONS

Barga et al., "Consistent Streaming Through Time: A Vision for Event Stream Processing," *CIDR 2007, Third Biennial Conference on Innovative Data Systems Research*, 2007, 363-374).

(Continued)

*Primary Examiner* — Alina N Boutah
(74) *Attorney, Agent, or Firm* — Fish & Richardson P.C.

(57) ABSTRACT

Implementations of the present disclosure include methods for providing transparency in streaming event data. In some implementations, methods include receiving a plurality of events, each event comprising event data and being generated by an event source in response to a real-world activity, processing the plurality of events using one or more complex event processing (CEP) rules to generate a complex event, in response to generating the complex event, generating at least one lineage event that comprises lineage information, the lineage information comprising information corresponding to one or more source events, each of the one or more source events contributing to the complex event, and storing the lineage event and the one or more source events in an event archive provided as a computer-readable storage medium.

19 Claims, 7 Drawing Sheets

(56) References Cited

U.S. PATENT DOCUMENTS

2012/0151322 A1* 6/2012 Lindsay ............ G06Q 50/01
   715/234
2012/0174013 A1* 7/2012 Kraus ............ G06Q 10/063
   715/771

OTHER PUBLICATIONS

Benjelloun et al., "Databases with Uncertainty and Lineage," *VLDB Journal*, 2008, 17(2):243-264.

Bhagwat et al., "An Annotation Management System for Relational Databases," *VLDB Journal*, 2005, 14(4):373-396.

Cui & Widom, "Lineage Tracing for General Data Warehouse Transformations," *VLDB Journal* 2003, 12(1):41-58.

Cui & Widom, "Practical Lineage Tracing in Data Warehouses," *ICDE*, 2000, 367-378.

Hagenbuchner and Sperduti, "A self-organizing map for adaptive processing of structured data," *IEEE Transactions on Neural Networks*, 2003, 491-505.

Heinis & Alonso, "Efficient Lineage Tracking for Scientific Workflows," *SIGMOD*, 2008, 1007-1018.

Kwon et al., "Clustering Events on Streams Using Complex Context Information," *IEEE International Conference on Data Mining Workshops*, 2008, 238-247.

Ontrup and Ritter, "Hyperbolic Self-Organizing Maps for Semantic Navigation," *Advances in Neural Information Processing Systems*, 2001, 8 pages.

Tasoulis et al., "Visualising the cluster structure of data streams," 7$^{th}$ *international conference on Intelligent data analysis*, 2007, 81-92.

Walter and Ritter, "On Interactive Visualization of Highdimensional Data," *ACM SIGKDD Int. Conf. on Knowledge Discovery and Data Mining*, 2002, 123-131.

Yongli et al., "RFIDSLT: A Data Lineage Tracing Method for Complex Query over RFID Streams," *ICEBE '09: Proceedings of the 2009 IEEE International Conference on e-Business Engineering*, 2009, 233-240.

* cited by examiner

LINEAGE INFORMATION FOR STREAMING EVENT DATA AND EVENT LINEAGE GRAPH STRUCTURES FOR VISUALIZATION

BACKGROUND

Cooperating businesses look toward closer cooperation across existing company borders and between several business partners to achieve improved economic competitiveness and a better reaction to market requirements. Resultant business processes are accompanied by an asynchronous, heterogeneous, loosely coupled and distributed communication via mostly technical low-level event data. To make this event data accessible to business experts or decision makers, the event data can be consolidated and aggregated to higher abstraction levels. This can be achieved using complex event processing (CEP) systems.

Fast and dynamic adaptation of business processes is advantageous to companies. In order to capture the current status of a business process, event data can be analyzed. For example, business experts or decision makers can draw conclusions and make decisions based on incoming event data. In event-based environments, low-level events are provided by event producers and are aggregated to higher level, business relevant events. Business experts and decision makers are able to adapt business processes based on the aggregated events. Further, business experts need to be able to trust and comprehend the aggregated events in order to react appropriately.

To derive reasonable and business relevant decisions from aggregated event data, a responsible business expert has to analyze and explore the data. This can be a complex process, because business event data can be subject to several distinct dimension level hierarchies such as time, location, data source, company organization level, data quality or event type.

SUMMARY

Implementations of the present disclosure include computer-implemented methods for providing transparency in streaming event data. In some implementations, methods include receiving, at one or more computing devices, a plurality of events, each event comprising event data and being generated by an event source in response to a real-world activity, processing, using the one or more computing devices, the plurality of events using one or more complex event processing (CEP) rules to generate a complex event, in response to generating the complex event, generating at least one lineage event that includes lineage information, the lineage information including information corresponding to one or more source events, each of the one or more source events contributing to the complex event, and storing the lineage event and the one or more source events in an event archive provided as a computer-readable storage medium.

In some implementations, the lineage information includes one or more of an identification of the complex event, an identification of each of the one or more source events, an identification of a CEP rule of the one or more CEP rules, the CEP rule being a rule that resulted in generation of the complex event.

In some implementations, the lineage information includes an identification of a CEP engine that generated the complex event.

In some implementations, methods further include providing an event bus that is executed using one or more computing devices, the event bus receiving each of the plurality of events and routes the plurality of events based on one or more subscriptions. Processing is performed using a CEP engine, the CEP engine subscribing to events received by the event bus. The CEP engine publishes the complex event to the event bus, the event bus providing the complex event to one or more event-based applications that are each executed using one or more computing devices.

In some implementations, the event archive subscribes to lineage events and receives the lineage event in response to publication of the lineage event. The event archive subscribes to the one or more source events and receives each of the one or more source events in response to publication of the one or more source events.

In some implementations, methods further include receiving a query, the query identifying the complex event, retrieving the lineage event from the event archive based on the query, retrieving each of the one or more source events from the event archive based on the lineage information of the lineage event, and transmitting the one or more source events for display to a user. The query is generated by an event-based application and the one or more source events are transmitted to the event-based application for display to the user.

In some implementations, methods further include receiving the complex event and each of the one or more source events at a graph builder, the graph builder provided as a program that is executed using one or more processors, processing the complex event and each of the one or more source events using the graph builder to generate a set of graphs, the set including one or more graphs, and generating a multi-dimensional visualization based on the set of graphs, the multi-dimensional visualization being navigable based on user input. The graph is provided as an acyclic graph including a plurality of nodes and a plurality of edges between nodes, each node corresponding one of the complex event and one of the one or more source events. Methods further include generating a self-organizing map (SOM) based on the graph, the multi-dimensional visualization being generated based on the SOM. The one or more graphs are provided as a directed ordered acyclic graph that is provided as input to the SOM. The SOM includes a node grid that is organized in hyperbolic space. Methods further include mapping the SOM to a mutli-dimensional unit disk to provide a projection of the SOM in multi-dimensional space. The multi-dimensional unit disk is provided as a Poincaré disk. Methods further include receiving the user input, and animating, in response to the user input, the multi-dimensional visualization to move a first node from a projection center toward a periphery of the multi-dimensional visualization and move a second node toward the projection center.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
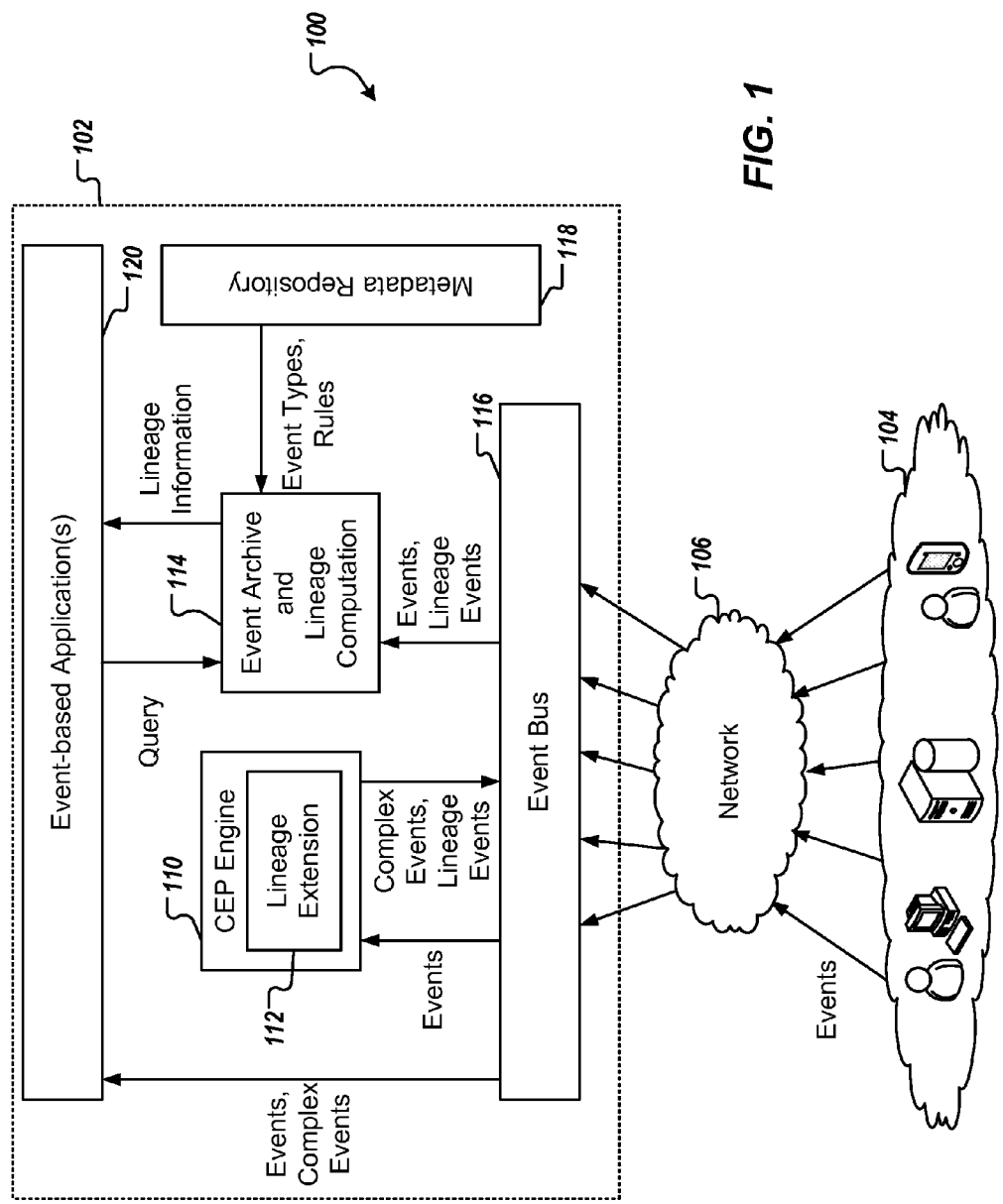
FIG. 1 depicts an example system architecture that can perform implementations of the present disclosure.

Implementations of the present disclosure are generally directed to retrieving lineage information for streaming event data. In general, streaming events are monitored and are processed using rules to generate one or more aggregate, or complex events. In response to the generation of a complex event, lineage events associated with the complex event are determined. Implementations of the present disclosure achieve this by extending complex event processing (CEP) by introducing lineage rules for generating the lineage events, by incorporating an event archive to store relevant lineage events, and by computing the lineage information based on the archived lineage events. Implementations of the present disclosure are also directed to visualization and exploration of CEP systems using hyperbolic self-organizing maps on lineage event graph structures.

In general, events are generated by event sources and each event includes data that represents the occurrence of a real-world event. A non-limiting example event can include data indicating that a particular radio frequency identification (RFID) tag was scanned at a particular time and at a particular location. This example event can include tag identification data, time data, location data, event type data and event name data (e.g., "scanned"). CEP includes the processing of streaming events occurring across all layers of one or more organizations to identify relevant events, and to recognize an occurrence of a complex event.

A complex event can include a pattern that is recognized within the streaming events. The pattern can be recognized based on one or more rules that are processed by a CEP engine and that are applied using a plurality of events. An example rule can include: if a product is removed from a shelf, and if the product leaves the store without payment for the product having been received, then a theft event has occurred. Using this example, a complex event includes a theft event that is recognized as the pattern: removal of a product from a shelf, removal of the product from the store, payment for the product not being received. Another example rule can include: accumulate all stolen articles that left the store at the same time, and, if the total price of all articles is higher than a threshold then notify the police. Another example rule can include: count all theft events corresponding to the same article, and, if the number of theft events per week/month for this article exceeds a defined threshold then increase the security level for this article. These example events that result in the complex event are each provided from event sources. Using RFID as a non-limiting example, removal of a product from a shelf can be detected based on an RFID sensor associated with the shelf detecting the removal of an RFID tag from the shelf, the RFID tag being attached to the product. Removal of the product from the store can be detected based on an RFID sensor associated with a store exit detecting the removal of the RFID tag from the store, again the RFID tag being attached to the product. Non-payment for the product can be detected based on a store sales system not having a record of the product being processed at a cashier station and/or payment having not otherwise been received. Continuing with the theft example above, the structure of the theft complex event can include: the event type (e.g., "theft"), the event ID, a timestamp, and/or the payload, which is a set of special attributes of an event (e.g., a list of stolen articles and total price of all articles).

CEP further includes the analysis of events and/or complex events, the impact that each may have on the one or more organizations and taking subsequent action in real-time in response to such events. By way of a simple, non-limiting example, a decision maker in a logistics domain may receive an event indicating that a shipment of products to a store has been delayed. In order to meet a key performance indicator (KPI) of on-time delivery, the decision maker looks to adapt the delivery process in response to the delay. However, for an appropriate adaption, the decision maker should know the cause of the delay. Without knowing the cause of the delay, the adaption could result in further delay. If, for example, the delay was caused by a thunder-storm at an airport, selecting another aircraft at the same airport would not result in an appropriate solution and the KPI of on-time delivery would still not be met.

Accordingly, and to enable effective adaptation of business processes in response to event occurrences, implementations of the present disclosure provide transparency of complex events through the use of lineage information. More particularly, and as discussed in further detail herein, lineage information for streaming event data is retrieved. Implementations of the present disclosure include lineage computation as well as components and techniques for the collection of the required information. More particularly, implementations of the present disclosure address the field of rule-based event processing, where complex events are generated based on rules and in response to the occurrence of other events. As discussed in further detail herein, sending, receiving and routing of the events can be based on a publish/subscribe paradigm, where event sources publish events and interested parties subscribe for receipt of published events. Implementations of the present disclosure enable users (e.g., decision makers) to trace back the events that led to a complex event, and/or are able to trace forward resultant events stemming from a particular event, complex or otherwise. In this manner, event transparency is provided.

Referring now to FIG. 1, an example system architecture 100 can be used to perform implementations of the present disclosure. The example system architecture 100 includes one or more computing devices 102 that receive one or more events from one or more event sources 104 over a network 106. The one or more computing devices 102 and/or the one or more event sources can include various forms of processing devices including, but not limited to, desktop computers, laptop computers, handheld computers, personal digital assistant (PDAs), cellular telephones, network appliances, smart phones, enhanced general packet radio service (EG-PRS) mobile phones, or a combination of any two or more of these example data processing devices or other data processing devices. The one or more computing devices 102 and/or the one or more event sources 104 can represent various forms of servers including, but not limited to a web server, an application server, a proxy server, a network server, or a server farm. Further, the one or more event sources 104 can include various forms of sensors and/or readers that are responsive to machine-readable tags. Example machine-readable tags can include tags having machine-readable code printed thereon (e.g., bar code, QR code) and/or RFID tags. The network 106 can include a large computer network, such as a local area network (LAN), wide area network (WAN), the Internet, a cellular network, or a combination thereof connecting any number of mobile clients, fixed clients, and servers. In some implementations, client computing devices can communicate with server computing devices via a virtual private network (VPN), Secure Shell (SSH) tunnel, or other secure network connection. In some implementations, the network 106 can include a corporate network (e.g., intranet) and one or more wireless access points.

The one or more computing devices 102 include a CEP engine module 110 having a lineage extension 112, an event archive and lineage computation module 114, an event bus module 116, a metadata repository 118 and one or more event-based applications 120. The CEP engine module 110 can be provided as one or more computer programs that are executed using one or more processors of the computing devices 102. The lineage extension module 112 can be provided as a sub-module of the CEP engine module 110 and can be provided as one or more computer programs that are executed using one or more processors of the computing devices 102. The event archive and lineage computation module 114 can be can be provided as one or more computer programs that are executed using one or more processors of the computing devices 102, and/or can be provided as a computer-readable medium of the computing devices 102 for storing lineage information. It is appreciated that instead of a single module 114, separate modules can be provided for the event archive and the lineage computation, respectively. The event bus module 116 can be provided as one or more computer programs that are executed using one or more processors of the computing devices 102. The metadata repository 118 can be provided as one or more computer-readable media of the computing devices 102.

The event-based applications 120 can be provided as one or more computer programs that are executed using one or more processors of the computing devices 102. In general, the event-based applications 120 receive events and lineage information, as discussed in further detail herein, and provide output to a user. The user can include a human user and/or a programmatic user. An example event-based application includes a business process management (BPM) application, such as NetWeaver BPM provided by SAP AG of Walldorf, Germany.

With continued reference to FIG. 1, the one or more event sources 104 publish events that are provided to the event bus module 116 through the network 106. The event bus module 116 filters and routes the received events. Events can be filtered based on event source. For example, a subscriber can request events from a particular system, and the events are filtered based on the particular system to publish those events to the particular subscriber. As an alternative, or in addition to, events can be filtered based on content. For example, a subscriber can request events regarding a particular topic. As another example, a subscriber can request events having a value that exceeds a specified threshold. The event bus module 116 routes the events to the event-based applications 120, the CEP engine module 110 and the event archive and lineage computation module 114. The CEP engine module 110 processes the streaming events as they are received to generate complex events. In particular, the CEP engine module 110 processes the received events in view of one or more pre-stored or pre-programmed rules that are used to recognize patterns of the events. In this manner, a pattern can be recognized based on application of one or more of the rules to the incoming events. The lineage extension module 112 extends the event processing within the CEP engine module 110 by adding one or more lineage rules. The lineage rules are processed to generate one or more lineage events in response to the CEP engine module 110 generating a complex event. A lineage rule can define a condition and an action. That is, if the condition holds then the action is taken. For example, a rule for generating a complex event can be provide as rule X. An example lineage rule can provide that, if rule X applies, generate a lineage event including lineage information corresponding to the complex event. In some implementations, a single rule can be provided for generating a complex event and a corresponding lineage event.

The lineage events contain relevant information for lineage tracking. For example, for a newly generated complex event, a respective lineage event can include one or more of the following information: an identification (ID) of the corresponding complex event, which can be referred to as the target event ID, IDs of one or more events contributing to the generation of the complex event, which can be referred to as source event IDs, an ID of the rule that generated the complex event, and/or an ID of the CEP engine module that generated the complex event (e.g., for distributed environments including multiple CEP engine modules).

With continued reference to FIG. 1, an event archiving component of the event archive and lineage computation module 114 subscribes to events and lineage events. In this manner, as events and lineage events are published through the event bus module 116, the events and lineage events are received by the event archiving component. In particular, the event archiving component subscribes to and materializes the events that are referenced by lineage events, which events can be identified by their corresponding event type. Event types as well as the rules for event processing can be maintained in the metadata repository 118, and can be accessed by the event archiving component.

A lineage computation component of the event archive and lineage computation module 114 computes the lineage information based on the events stored in the event archiving component. For a given complex event, the lineage computation component retrieves the respective lineage event based on the ID of the complex event (i.e., the target event ID). The lineage event provides the source event IDs of the respective contributing events. The contributing events can be retrieved from the event archiving component based on their respective source event IDs. This can be recursively repeated to hierarchically trace back complex events. In some implementations, only lineage rules for specific high-level events (i.e., events of interest) are registered and used by the lineage extension module 112. In this manner, the processing and memory burden associated with tracking lineage information for each and every event is reduced by reducing the number of events to generate, transfer, and store.

Figure 2:
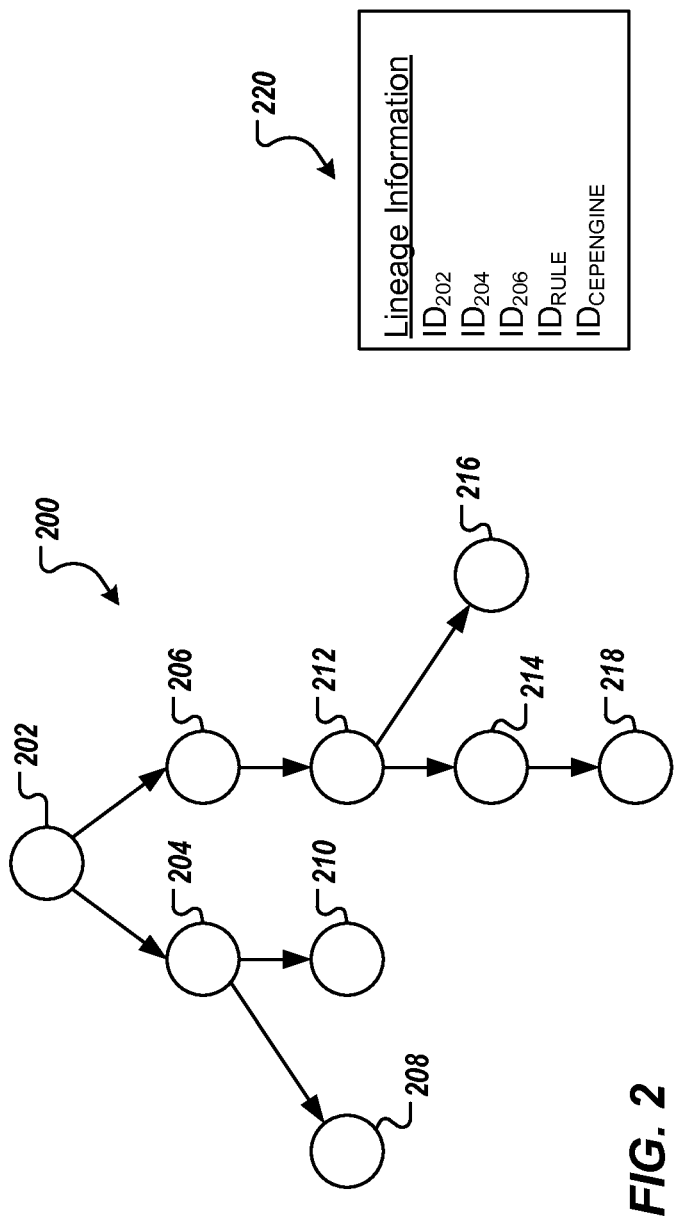
FIG. 2 depicts an example acyclic graph.

Referring now to FIG. 2, an example acyclic graph 200 illustrates an example complex event 202 (i.e., target event) and associated events 204-218 (i.e., source events). In the example of FIG. 2, the complex event 202 can be generated in response to a CEP engine processing one or more of the events 204-218 based on one or more rules. In this manner, the events 204-218 can include events that led to the generation of the complex event 202. In some implementations, the acyclic graph 200 can provide the event 202 as a source event, and the events 204-218 as future events (i.e., after the occurrence of the event 202) that were at least partially the result of the event 202.

In response to generation of the complex event 202 (e.g., by the CEP engine module 110), a lineage event can be generated (e.g., by the lineage extension module 112) and can include lineage information 220. The lineage information 220 can be provided as a data set that includes information representative of one or more events that led to the generation of the complex event 202. In the example of FIG. 2, the lineage information 220 includes the ID of the complex event 202 ($ID_{202}$), the IDs of each of the source events 204, 206 ($ID_{204}$, $ID_{206}$) and the ID of the rule ($ID_{RULE}$) that immediately led to generation of the complex event 202, and the ID of the CEP engine ($ID_{CEPENGINE}$) that generated the complex event 202. The example acyclic graph 200 of FIG. 2 illustrates an example relationship between the complex event 202 and the source events 204, 202, and provides a basis for visualization, as discussed in further detail herein. In some implementations, the IDs of each of the source events 204-218 ($ID_{204}$, ..., $ID_{218}$) that ultimately led to generation of the complex event 202 can be provided in the lineage information 220.

In operation, the CEP engine module 110 processes a plurality of received events based on one or more rules. If a particular condition is met, as defined by the rules, the CEP engine module 110 generates a corresponding complex event. For example, a complex event can include an "unload completed" event that is generated in response to a plurality of "item unloaded" events and a "door closed" event. In this manner, as single items are unloaded from a delivery vehicle for example, individual unload events are generated, and unload completion can be indicated by closing of the door of the delivery vehicle. In response to generation of the complex event, a lineage event is generated by the lineage extension module 112. The lineage event includes the ID of the complex event and the IDs of the contributing, or source events, as discussed in further detail herein. Using the example above, a lineage event includes lineage information that can include an ID corresponding to the "unload completed" complex event, as well as the IDs of the individual "item unloaded" events and the "door closed" event. In some implementations, the lineage information further includes an ID of the rule that generated the complex event, and/or an ID of the CEP engine module that generated the complex event.

The lineage event is published and is received by the subscribing event archive and lineage computation component 114. The event archive and lineage computation component 114 also subscribes to the events underlying the complex event based on the event type, event source, and/or event content. In this manner, the event archive and lineage computation component 114 receives the underlying events and their corresponding event data, and stores the events in a computer-readable repository.

The events and complex events are provided to the event-based applications 120. In response to the presence of a complex event, for example, a user of an event-based application may provide user input to query the underlying causes of the complex event. Accordingly, the user input (e.g., a request for further information regarding a particular complex event) can be provided to the event archive and lineage computation component 114 as a query that includes the ID of the complex event. The event archive and lineage computation component 114 can retrieve the corresponding lineage event based on the ID of the complex event. As discussed above, the lineage event provides IDs corresponding to the events underlying the complex event. Consequently, the event archive and lineage computation component 114 can retrieve each of the events based on the respective event IDs. The event archive and lineage computation component 114 can provide the events and event data underlying the particular complex event to the event-based application 120 for display to the user.

Figure 3:
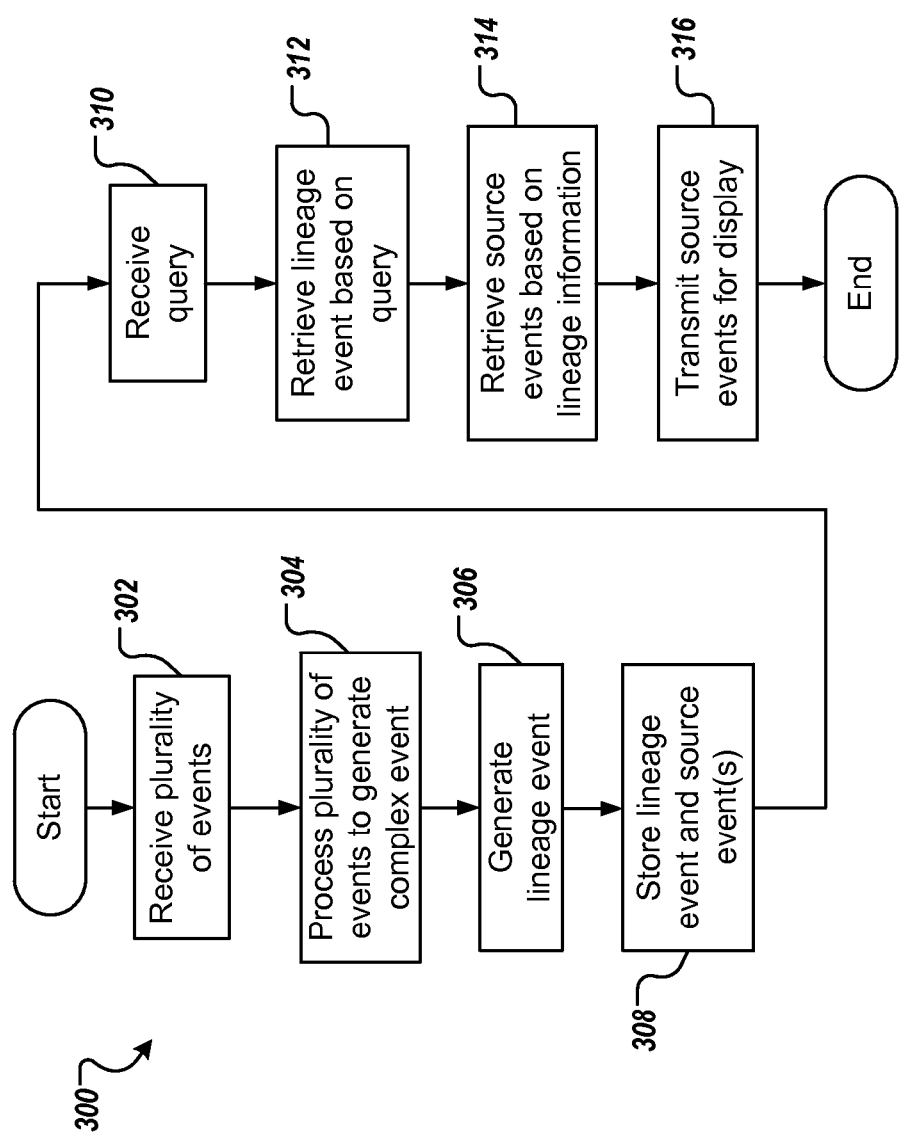
FIG. 3 depicts an example process for generating lineage events in accordance with implementations of the present disclosure.

FIG. 3 is a flow diagram of an example process 300 that can be executed in accordance with implementations of the present disclosure. A plurality of events are received (302). Each event includes event data and is generated by an event source in response to a real-world activity. For example, the plurality of events can be received by the CEP engine module 110 and are generated by one or more of the event sources 104 of FIG. 1. The plurality of events are processed using one or more CEP rules to generate a complex event (304). For example, the CEP engine module 110 of FIG. 1 processes the plurality of events in view of the one or more CEP rules to generate a complex event. In response to generating the complex event, at least one lineage event is generated (306). The lineage event includes lineage information corresponding to one or more source events, each of the one or more source events contributing to the complex event. For example, the lineage extension module 112 generates the lineage event in response to generation of the complex event. The lineage event and the one or more source events are stored in an event archive (308). For example, the event archive and lineage computation component 114 can store the lineage event and the one or more source events in a computer-readable storage medium.

A query is received (310). The query identifies the complex event. For example, the query can be generated based on user input to an event-based application (e.g., the event-based application 120 of FIG. 1) and can be received by the event archive and lineage computation component 114. A lineage event corresponding to the complex event is retrieved from the event archive based on the query (312). For example, the event archive and lineage computation component 114 retrieves the lineage event. Each of the one or more source events are retrieved from the event archive based on the lineage information of the lineage event (314). For example, the event archive and lineage computation component 114 retrieves the one or more source events from the event archive based on the lineage information. The one or more source events are transmitted for display to a user (316). For example, the event archive and lineage computation component 114 can provide the one or more source events to the event-based application 120, which can process the source events and display the source events to a user.

As discussed above, implementations of the present disclosure are further directed to visualization and exploration of complex event data. In particular, to derive reasonable and business relevant decisions from high-level abstractions, such as complex events, a user (e.g., business expert) analyzes and explores the data. Analysis and exploration of the data can be a complex process, because business event data, as well as other types of data, can be subject to several distinct dimension level hierarchies (e.g., time, location, data source, company organization level, data quality or event type). For example, a user can send an initial request specifying a certain dimension level and a desired information granularity, which can be visualized in a tabular our graphical view (e.g., the sales rates of a set of articles within a given time period (e.g., yearly)). From this point of view, the user can navigate through several other views by operations like drill down (e.g., to a monthly time scale), roll up (e.g., to a visualization of sale rates according to product groups) or projection to other dimension levels (e.g., the visualization of sale rates according to certain company locations). The user can perform this navigation until finding sufficient evidence to make a decision. A drawback of this approach, however, includes the difficulty in keeping an overview of all other possible hierarchy levels of the data, while inspecting specialized views and formulating new requests.

As discussed above, lineage information regarding the temporal, logical and causal history of events (e.g., a complex event) is a comprehensive data source that improves the transparency and value of business decisions. By way of non-limiting example, the domain of fraud detection can be considered. In this example domain, a user may need to know the amount of a bank transfer, the sender and the acceptor of the bank transfer, as well as the information that the particular transfer directly follows an incoming payment from an account having several failed access trials. Lineage information also increases the complexity of the exploration and analysis process, because the user must explore the source events of a target event or has to specify the history of an event in a complex request. Accordingly, implementations of the present disclosure provide intuitive and descriptive visualization methods that can be used to inspect and explore complex local event structures as well as global business information without switching between several views of dimension and resolution levels.

Figure 4:
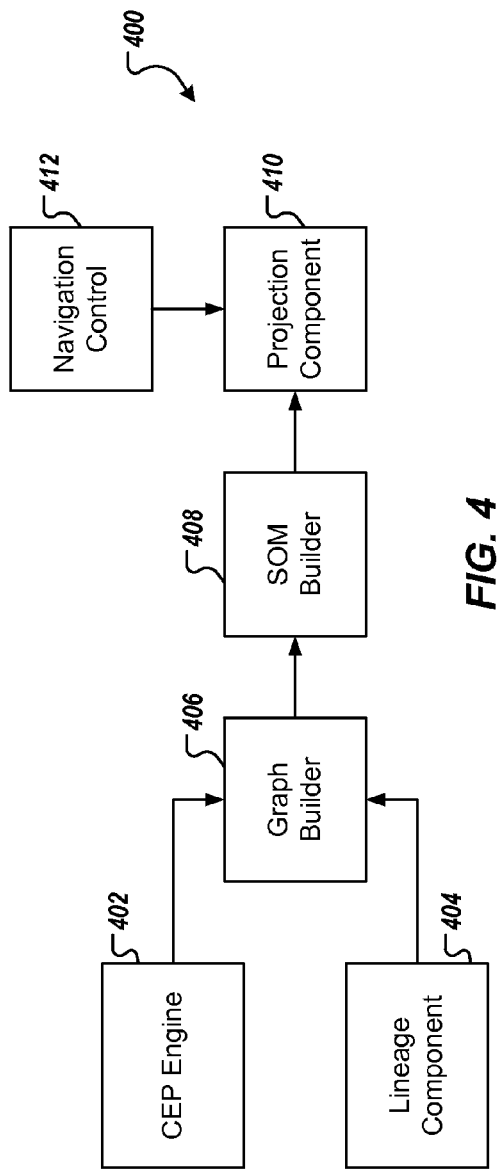
FIG. 4 depicts example modules that can be implemented to provide visualization of events.

Referring now to FIG. 4, implementations of the present disclosure further enable the projection of complex event data and associated lineage graph structures to a multi-dimensional feature map that can be used to visually inspect and actively explore the data. In this manner, the comfort and usability of complex event processing systems are increased. A system 400 of FIG. 4 describes an example for generation and navigation based on multi-dimensional feature maps. The system 400 includes a CEP engine 402 (e.g., the CEP engine module 110 of FIG. 1), a lineage component 404 (e.g., the lineage extension module 112 of FIG. 1), a graph builder component 406, a self-organizing map (SOM) builder component 408, a projection component 410 and a navigation control component 412.

The CEP engine 402 permanently processes high volumes of event data. As discussed above, CEP engines are characterized by a significant volume of input and output data, and receive basis event data from distributed event sources (e.g., event sources 104 of FIG. 1) and aggregate the events to higher abstraction levels by applying production rules for complex events. The resulting complex events are added to the stream of input events and can themselves contribute to new events on the next higher abstraction level. In accordance with the present disclosure, the input and output data of CEP engines and their relationships are made visually accessible for human users.

The lineage component 404 collects and maintains lineage information of the events. As discussed above, the lineage component 404 is provided as an extension of the CEP engine 402 and generates one or more lineage events for each complex event produced by the CEP engine. As also discussed above, each lineage event contains relevant information for lineage tracking. The graph builder component 406 receives event and lineage data from the CEP engine 402 and the lineage component 406 and processes the data to generate an acyclic graph for each event. More particularly, the events and the lineage information of the lineage events are combined into lineage graphs (e.g., the acyclic graph 200 of FIG. 2), where each event is a node of the graph and the attributes of the raw events are attached to the nodes. In some implementations, the acyclic graph can include a directed ordered acyclic graph (DOAG). The directed edges in the graph describe the input/output relations of the events according to the production rules of the CEP engine.

In some implementations, there are at least two approaches to construct the graph. In both approaches, the graph starts from an initial event as root node. In the case of tracking, the edges point from a selected event to all complex events that have been derived from this event. Accordingly, the edges point forward in the processing order. In the case of backtracking, the edges point from a complex event towards the basis event that contributed to the generation of this event. Accordingly, the edges point backward in processing order. The example acyclic graph of FIG. 2 illustrates backtracking, where the complex event 202 is provided as the root node. To use the graph structures as input for the SOM builder component 408, each node in the graph is represented as a numerical vector of fixed length. Consequently, ordering of the edges of a node are uniquely defined by the production rules of the CEP engine, and each node in the acyclic graph only has a pre-defined maximum number of child nodes (i.e., threshold number of child nodes). If the number of child nodes exceeds the threshold number of child nodes, some of the child nodes can be transferred from the parent node to a newly introduced intermediate child node.

In some implementations, time and memory restrictions may be considered, such that pruning methods can be applied to the acyclic graph when the depth of the acyclic graph exceeds a threshold depth. In this manner, deep acyclic graphs can be pruned for efficient handling. For example, each acyclic graph can include a number of levels, wherein levels above a threshold level are pruned from the acyclic graph. With reference to the example acyclic graph 200 of FIG. 2, the node 202 is provided at a root level, the nodes 204, 206 are provided at a first child level, the nodes 208, 210, 212 are provided at a second child level, the nodes 214, 216 are provided at a third child level and the node 218 is provided at a fourth child level. An example level threshold can include the third child level, such that the nodes 214, 216, 218 would be pruned from the example acyclic graph 200.

The graph builder component 406 outputs the acyclic graph to the SOM builder component 408. The SOM builder component trains a SOM on the graph structures. In some implementations, the SOM can be provided as a hyperbolical SOM (HSOM). An SOM is an artificial neural network that is trained using, for example, unsupervised learning to produce a low-dimensional (e.g., two-dimensional) discretized representation of the input space of the training samples. SOMs differ from other artificial neural networks in the sense that they use a neighborhood function to preserve the topology properties of the input space. In this manner, the SOM is useful for scientific visualization of low-dimensional views of high-dimensional data (akin to multi-dimensional scaling). Training builds the SOM using input examples. For example, an initial SOM can be provided having nodes that are arbitrarily distributed in data space, and a distribution of training data can be provided. Samples of training data can be iteratively selected and a node of the SOM closest to the currently selected training data is moved towards the particular training data, as are neighboring nodes (to a lesser extent). After several iterations, the SOM approximates the distribution of training data.

Figure 5:
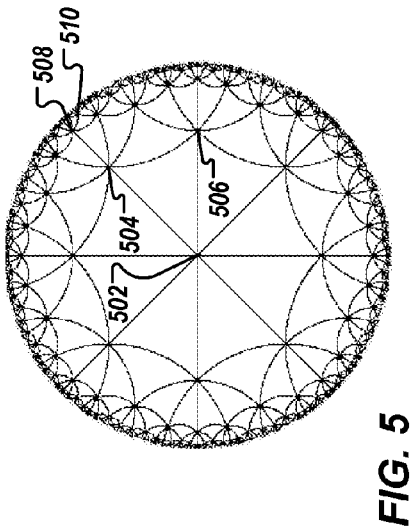
FIG. 5 depicts an example Poincaré disk projection.

In some implementations, the SOM used includes specific modifications. In one modification, input to the SOM is provided in the form of DOAGs instead of vector input, where the DOAG is mapped to a numerical vector of fixed length to apply a standard SOM. In another modification, the underlying node grid of the SOM is organized in a special hyperbolic space. Properties of the hyperbolic space cause a kind of "fish eye" effect when mapping the SOM to a two-dimensional unit disk, for example. By way of non-limiting example, the mapping can be achieved using a Poincaré model. An example Poincaré projection disk 500 is illustrated in FIG. 5. As a result of the "fish eye" effect, points close to the projection center are displayed in their original relations, while points at the periphery of the disk are strongly compressed. In the example of FIG. 5, a point 502 at the projection center and points 504, 506 close to the projection center are displayed in nearly their original relations. The point 506 and points 508, 510 and the relations therebetween are increasingly compressed toward the periphery. This enables mapping of an area that grows exponential with distance from the projection center.

The SOM builder component 408 outputs the SOM to the projection component 410. The projection component 410 projects the SOM into multi-dimensional (e.g., two-dimensional) space as a feature map. In particular, the projection component 410 applies the Poincaré model to the SOM and projects the grid nodes of the SOM to the multi-dimensional unit disk (e.g., the Poincaré projection disk 500 of FIG. 5). The grid structure at the center of the projection is shown in high resolution, while the grid structure further from the projection center and closer to the periphery is shown highly compressed. The so-provided feature map can be displayed to a human user using a display device. For example, the feature map can be displayed using a graphical user interface (GUI). In this manner, the feature map can be visually inspected by the human user. Besides the projection of the node grid, additional information can be added to the visualization. For example glyph plotting (e.g., adding shapes) and/or coloring can be added based on features of the input data.

Figure 6:
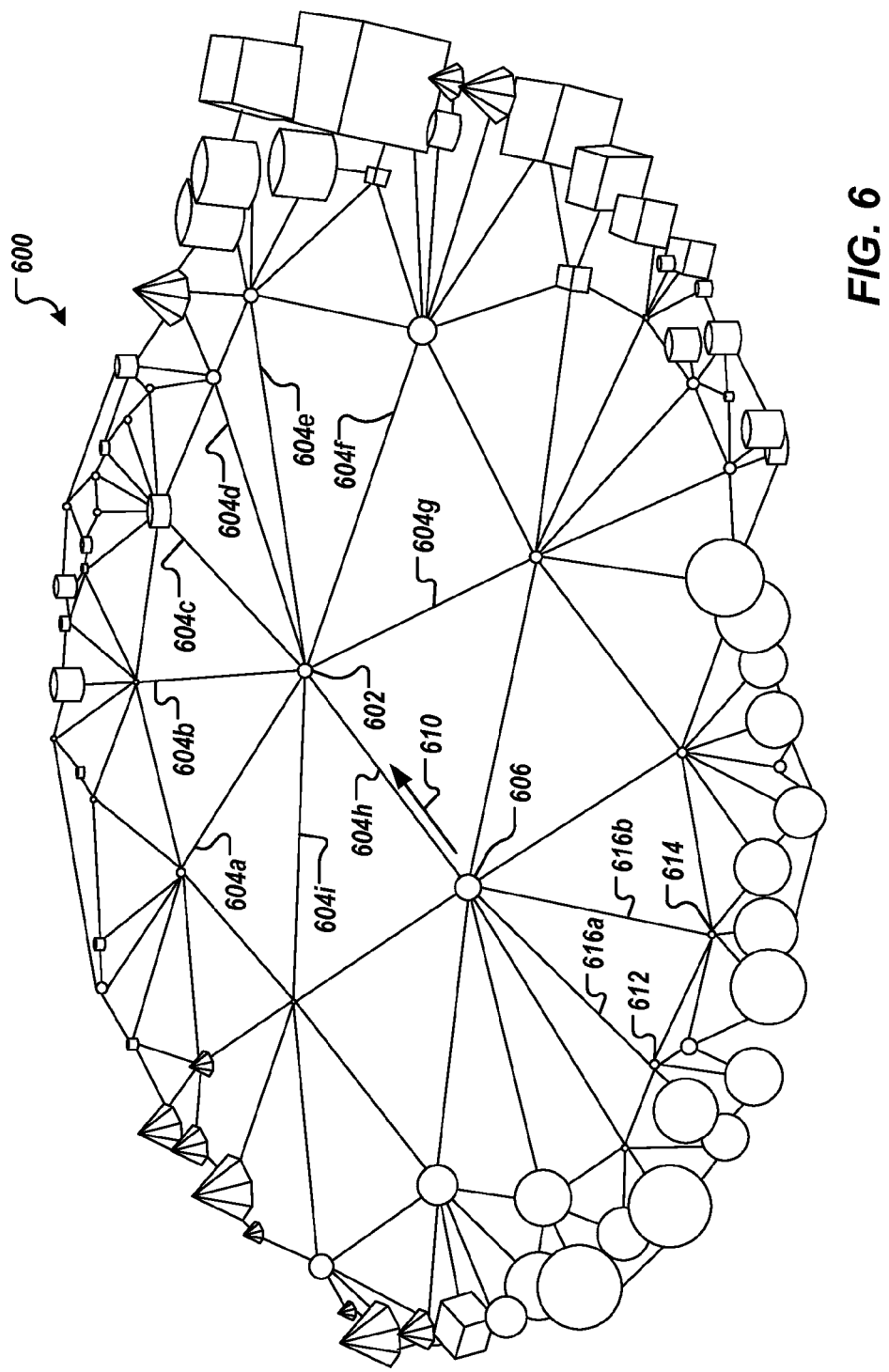
FIG. 6 depicts an example visualization of lineage data.

FIG. 6 depicts an example visualization 600 in accordance with implementations of the present disclosure. Nodes of the example visualization 600 can correspond to one or more events, complex events and/or lineage events. In FIG. 6, a node 602 is provided at an approximate projection center and relationships 604*a-i* between the node 602 and other nodes of the visualization 600 are provided. For example, the relationship 604*h* corresponds to a relationship between the node 602 and a node 606. The relationships in the neighborhood of node 602 are shown in higher resolution and detail, while relationships between other nodes toward the periphery of the visualization 600 are compressed and are shown in less detail. In the example visualization of FIG. 6, nodes can be provided as icons having different shapes to visually express characteristics of the particular node. For example, the nodes 602, 606 can be provided as spheres that may indicate one type of event, while other nodes are provided as cylinders, cones and cubes indicating other types of events. Further, node or shape size can be used to express further characteristics of particular nodes. In some implementations, color can also be used to express further characteristics of particular nodes. In some implementations, the term relationship can indicate a similarity of proximity in the multi-dimensional data/feature/event space.

With continued reference to FIG. 6, each node, or icon, is associated with a subset, or sub-stream, of all events. The nodes can correspond to any prototypic property. Example properties can include event type, values from the payload of the event, the relational structure of the events (e.g., width and the depth of a corresponding lineage graph, or any combination thereof). In some implementations, a node can be substituted with a mean (e.g., typical) lineage graph (e.g., acyclic graph 200 of FIG. 2) of the corresponding event set, or the mean (e.g., typical) payroll of the corresponding event set. In such implementations, a GUI can be used to trigger further interactions with the event sets (i.e., streams) (e.g., browsing the corresponding subset (-stream), or adding/removing the corresponding event to/from a filter.

The navigation component 412 can receive input from the human user and can generate projection commands based on the user input. For example, the human user can use one or more input devices (e.g., touch-screen display, mouse, keyboard, voice-recognition) to provide input to a GUI. The projection component 410 can receive the projection commands and can adjust the feature map accordingly. In this manner, the human user can navigate through the feature map, as discussed in further detail below. In particular, the input can indicate the desired projection center. In response to the input, the projection component 410 adjusts the feature map such that the desired projection center is provided as the actual projection center in the visualization. By changing the position of the center, the focus of the visualization moves through the node space. Using the visualization 600 of FIG. 6 as an example, the user input may indicate that the node 606 is to be moved to the projection center approximately along the line 610. In response to the user input, the visualization 600 is scrolled to move the node 606 to the projection center, while the node 602 is moved toward the periphery of the visualization. Consequently, the view of the relationships 604*a-g* and 604*i* is condensed, while the view of the relationships between the node 606 and other nodes is expanded and such other nodes come into greater resolution. For example, the nodes 612, 614 and the respective relationships 616*a*, 616*b* are moved toward the projection center and the view is simultaneously expanded to show greater detail.

Figure 7:
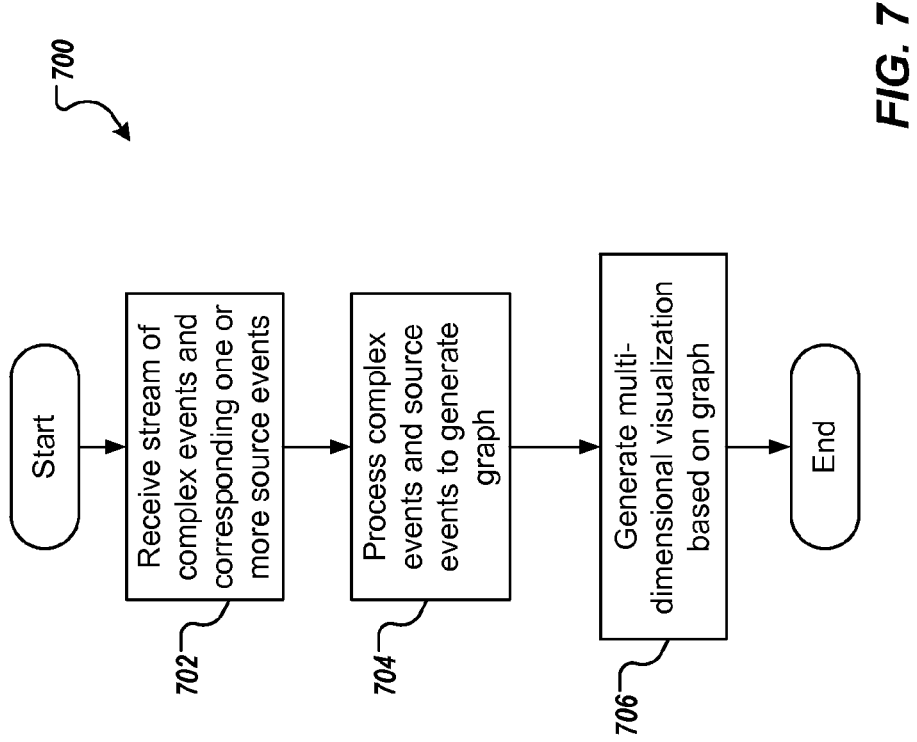
FIG. 7 depicts an example process for generating a multi-dimensional visualization of event data.

FIG. 7 is a flow diagram of an example process 700 that can be executed in accordance with implementations of the present disclosure. A stream of complex events is received, and, for each complex event, one or more source events are received (702). For example, the graph builder component 406 of FIG. 4 can receive the complex events and source events from the CEP engine 402 and the lineage component 404. The complex events and each of the one or more source events are processed to generate a graph (704). For example, the graph builder component 406 can process the complex events and each of the one or more source events to generate an acyclic graph (e.g., the acyclic graph 200 of FIG. 2). A multi-dimensional visualization is generated based on the graph (706), the multi-dimensional visualization being navigable based on user input.

Implementations of the present disclosure provide comprehensive lineage information, returning both the applied operations and the processed input data. More importantly, this information is related such that a user can track which data was processed by which operation (i.e., rule). The explicit recordation of applied operations (i.e., rules) within the lineage events enables lineage information of arbitrary operations, and is not limited to a specific set of operations. Further, flexibility is provided in that the control of lineage tracking using special rules within the CEP engine allows for lineage tracking of specific types of events. Furthermore, lineage tracking can be activated or deactivated. Because the lineage information is maintained in a lineage event archive, the lineage information can be quickly and efficiently retrieved at query time. In other words, it is not required to rerun the whole event processing for retrieving the lineage information.

Lineage tracking is highly relevant for dynamic business processes. For appropriate actions and well-founded decisions, business experts are provided with deep insight into the underlying processes through the lineage information. The lineage information also increases an expert's trust in the provided events. Furthermore, root-cause analyses based on lineage information is enabled and helps to reveal weak spots in business processes. In this manner, optimization potential for the business processes can be revealed. These benefits also hold for the application field of business activity monitoring where events are aggregated to KPIs that monitor business processes and business critical resources.

Other fields that can benefit from implementations of the present disclosure can include market data analysis and sensor networks. In market data analysis, stock and resource prices are regarded as events that are continuously analyzed in real-time to detect trends or changes in order to support quick reaction. In sensor networks, the focus is on monitoring where events from devices are collected and combined to more confident and meaningful events. In these application fields, lineage information provides valuable insight into the underlying processes. Using lineage information users can see what happened and why did it happen providing transparency that can highly contribute to better decision support.

Implementations of the present disclosure also provide for visualization of event and lineage information. As discussed above, information about the temporal, logical and causal history of events is integrated into the visualization. Multi-resolution visualization is provided, in which the exponential neighborhood of an event is visible in a multi-dimensional view ("fish eye" optics), and multiple dimension level hierarchies can be simultaneously displayed. The direct neighborhood of an event is shown in a high resolution, while the farther neighborhood is shown highly compressed at the border, or periphery of the visualization. The visualization can be used to navigate through the data. In this manner, application of the benefits of SOMs to the domain of complex event processing enables a user to navigate through the data by pointing into a direction on the unit disk. Example application domains for implementations of the present disclosure can include fraud detection, detection of delays in logistical processes, traffic supervision and stock analysis in trade.

As noted above, lineage information can improve the transparency and value of business decisions. It is highly useful that event structures not only cluster according to similar event types of event attribute, but also to similar event history. Implementations of the present disclosure enable classification and selection of complex event types to trigger specialized rules or further analyses on these classes. Example domains include sales analysis, supply chain management, fraud detection and traffic supervision, where the classification of event lineage information can improve the underlying business processes. For example, when analyzing the annual sales of a product portfolio, products can be classified based on annual sales concentrating on certain months or single locations against cases where they are distributed equally over the whole organization or time span. In this manner, it is possible to implement specialized sales and ordering strategies for the different types of products.

For supply chain management, it can be useful to distinguish between simple products that are created along a single production chain and complex products where the production process branches into several distinct production chains for individual components. In the context of fraud detection monthly credit card bills may be visually inspected and can be visually differentiated according to different user profiles (e.g., users with a high frequency and local fluctuation of access to their credit card as opposed to users with rare and locally restricted access to their credit card). This enables credit card bills to be quickly recognized and inspected where the customer shows sudden changes from their user profile as initial subjects of potential cases of fraud. In the case of traffic supervision, it may be useful to distinguish between traffic jams caused by different reason (e.g., an accident, construction, areas of high traffic concentration due to special events), such that specialized countermeasures can be triggered.

Figure 8:
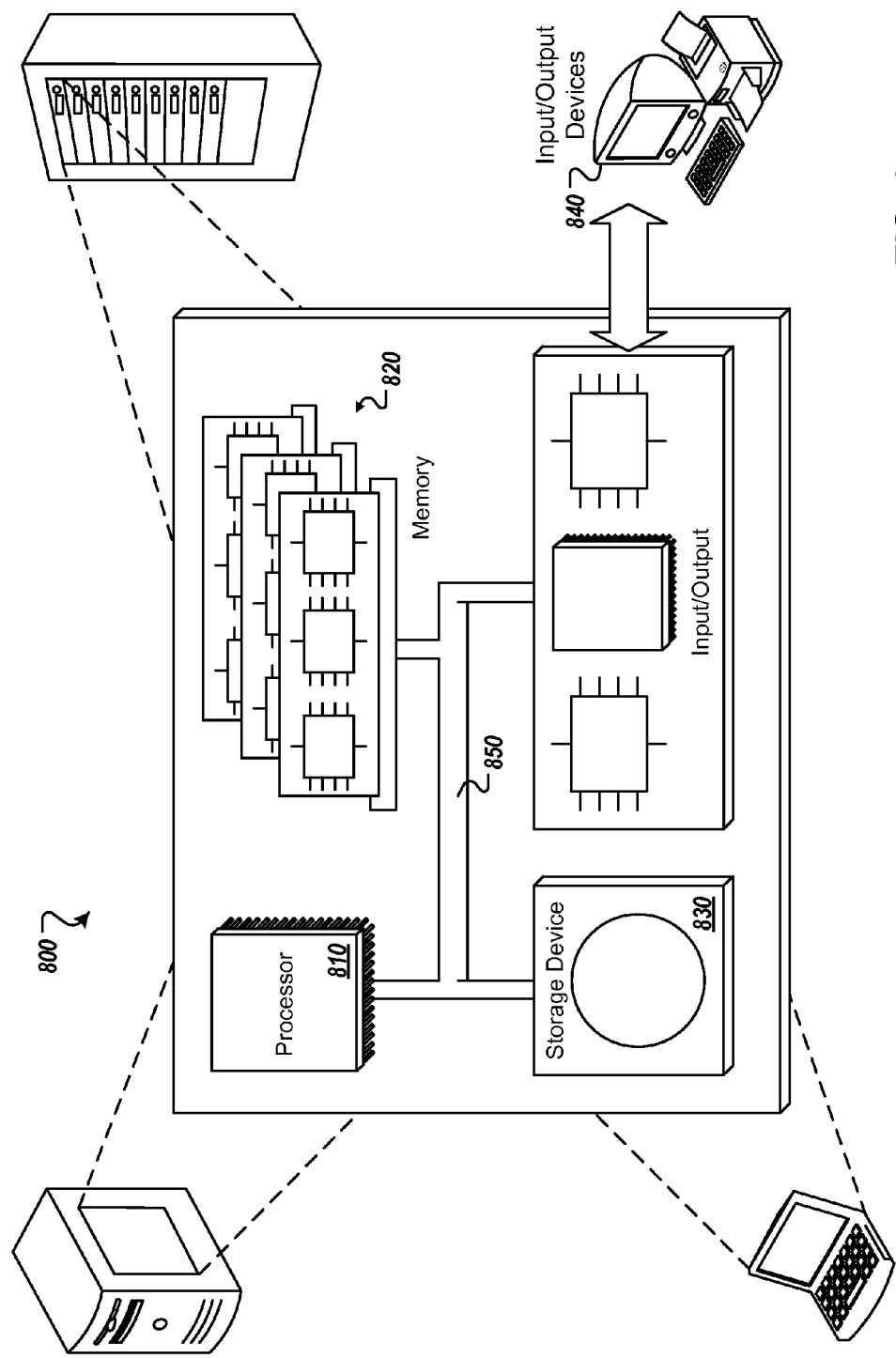
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit. The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing transparency in streaming event data, the method comprising:
    receiving, at one or more computing devices, a plurality of events, each event comprising event data and being generated by an event source in response to a real-world activity;
    processing, using the one or more computing devices, the plurality of events using one or more complex event processing (CEP) rules to generate a complex event;
    in response to generating the complex event, generating at least one lineage event that comprises lineage information, the lineage information comprising respective event information representative of each of one or more source events and respective rule information representative of each of the one or more CEP rules, each of the one or more source events contributing to the complex event, the event information enabling lineage tracking and retrieval of the one or more source events from an event archive, the rule information enabling retrieval of the one or more CEP rules from the event archive and defining a condition of applying an action in response to the complex event;
    storing the lineage event and the one or more source events in the event archive, the event archive being provided as a non-transitory computer-readable storage medium;
    receiving the lineage event, the complex event and each of the one or more source events at a graph builder, the graph builder provided as a program that is executed using one or more processors;
    processing the lineage event, the complex event and each of the one or more source events using the graph builder to generate a set of graphs, the set comprising one or more graphs; and
    generating a multi-dimensional visualization based on the set of graphs, the multi-dimensional visualization being navigable based on user input.

2. The method of claim 1, wherein the lineage information comprises one or more of an identification of the complex event, an identification of each of the one or more source events, an identification of a CEP rule of the one or more CEP rules, the CEP rule being a rule that resulted in generation of the complex event.

3. The method of claim 1, wherein the lineage information comprises an identification of a CEP engine that generated the complex event.

4. The method of claim 1, further comprising providing an event bus that is executed using one or more computing devices, the event bus receiving each of the plurality of events and routes the plurality of events based on one or more subscriptions.

5. The method of claim 4, wherein processing is performed using a CEP engine, the CEP engine subscribing to events received by the event bus.

6. The method of claim 5, wherein the CEP engine publishes the complex event to the event bus, the event bus providing the complex event to one or more event-based applications that are each executed using one or more computing devices.

7. The method of claim 1, wherein the event archive subscribes to lineage events and receives the lineage event in response to publication of the lineage event.

8. The method of claim 7, wherein the event archive subscribes to the one or more source events and receives each of the one or more source events in response to publication of the one or more source events.

9. The method of claim 1, further comprising:
receiving a query, the query identifying the complex event;
retrieving the lineage event from the event archive based on the query;
retrieving each of the one or more source events from the event archive based on the lineage information of the lineage event; and
transmitting the one or more source events for display to a user.

10. The method of claim 9, wherein the query is generated by an event-based application and the one or more source events are transmitted to the event-based application for display to the user.

11. The method of claim 1, wherein the graph is provided as an acyclic graph comprising a plurality of nodes and a plurality of edges between nodes, each node corresponding one of the complex event and one of the one or more source events.

12. The method of claim 1, further comprising generating a self-organizing map (SOM) based on the graph, the multi-dimensional visualization being generated based on the SOM.

13. The method of claim 12, wherein the one or more graphs are provided as a directed ordered acyclic graph that is provided as input to the SOM.

14. The method of claim 12, wherein the SOM comprises a node grid that is organized in hyperbolic space.

15. The method of claim 12, further comprising mapping the SOM to a multi-dimensional unit disk to provide a projection of the SOM in multi-dimensional space.

16. The method of claim 15, wherein the multi-dimensional unit disk is provided as a Poincaré disk.

17. The method of claim 1, further comprising: receiving the user input; and animating, in response to the user input, the multi-dimensional visualization to move a first node from a projection center toward a periphery of the multi-dimensional visualization and move a second node toward the projection center.

18. A computer-readable storage medium coupled to one or more processors and having instructions stored thereon which, when executed by the one or more processors, cause the one or more processors to perform operations for providing transparency in streaming event data, the operations comprising:
receiving, at one or more computing devices, a plurality of events, each event comprising event data and being generated by an event source in response to a real-world activity;
processing, using the one or more computing devices, the plurality of events using one or more complex event processing (CEP) rules to generate a complex event;
in response to generating the complex event, generating at least one lineage event that comprises lineage information, the lineage information comprising respective event information representative of each of one or more source events and respective rule information representative of each of the one or more CEP rules, each of the one or more source events contributing to the complex event, the event information enabling lineage tracking and retrieval of the one or more source events from an event archive, the rule information enabling retrieval of the one or more CEP rules from the event archive and defining a condition of applying an action in response to the complex event;
storing the lineage event and the one or more source events in the event archive, the event archive being provided as a non-transitory computer-readable storage medium;
receiving the lineage event, the complex event and each of the one or more source events at a graph builder, the graph builder provided as a program that is executed using one or more processors;
processing the lineage event, the complex event and each of the one or more source events using the graph builder to generate a graph; and
generating a multi-dimensional visualization based on the graph, the multi-dimensional visualization being navigable based on user input.

19. A system, comprising:
a computing device; and
a computer-readable storage device coupled to the computing device and having instructions stored thereon which, when executed by the computing device, cause the computing device to perform operations for providing transparency in streaming event data, the operations comprising:
receiving a plurality of events, each event comprising event data and being generated by an event source in response to a real-world activity;
processing the plurality of events using one or more complex event processing (CEP) rules to generate a complex event;
in response to generating the complex event, generating at least one lineage event that comprises lineage information, the lineage information comprising respective event information representative of each of one or more source events and respective rule information representative of each of the one or more CEP rules, each of the one or more source events contributing to the complex event, the event information enabling retrieval of the one or more source events from an event archive, the rule information enabling lineage tracking and retrieval of the one or more source events from an event archive, the rule information enabling retrieval of the one or more CEP rules from the event archive and defining a condition of applying an action in response to the complex event;
storing the lineage event and the one or more source events in the event archive the event archive being provided as a non-transitory computer-readable storage medium;
receiving the lineage event, the complex event and each of the one or more source events at a graph builder, the graph builder provided as a program that is executed using one or more processors;

processing the lineage event, the complex event and each of the one or more source events using the graph builder to generate a graph; and generating a multi-dimensional visualization based on the graph, the multi-dimensional visualization being navigable based on user input.

\* \* \* \* \*